United States Patent
Jeon et al.

(10) Patent No.: US 10,652,834 B2
(45) Date of Patent: May 12, 2020

(54) DISTRIBUTED LINK SCHEDULING TECHNIQUE FOR DEVICE TO DEVICE COMMUNICATION

(71) Applicant: Intel IP Corporation, Santa Clara, CA (US)

(72) Inventors: Jeongho Jeon, San Jose, CA (US); Huaning Niu, Milpitas, CA (US); Qinghua Li, San Ramon, CA (US)

(73) Assignee: Apple Inc., Cupertino, CA (US)

( * ) Notice: Subject to any disclaimer, the term of this patent is extended or adjusted under 35 U.S.C. 154(b) by 117 days.

(21) Appl. No.: 15/575,544

(22) PCT Filed: Dec. 18, 2015

(86) PCT No.: PCT/US2015/066744
§ 371 (c)(1),
(2) Date: Nov. 20, 2017

(87) PCT Pub. No.: WO2017/003508
PCT Pub. Date: Jan. 5, 2017

(65) Prior Publication Data
US 2018/0132190 A1 May 10, 2018

Related U.S. Application Data

(60) Provisional application No. 62/187,071, filed on Jun. 30, 2015.

(51) Int. Cl.
*H04W 52/24* (2009.01)
*H04W 52/38* (2009.01)
(Continued)

(52) U.S. Cl.
CPC ......... *H04W 52/24* (2013.01); *H04W 52/242* (2013.01); *H04W 52/30* (2013.01);
(Continued)

(58) Field of Classification Search
CPC ... H04W 52/24; H04W 52/242; H04W 52/30; H04W 52/383; H04W 72/0446;
(Continued)

(56) References Cited

U.S. PATENT DOCUMENTS

2009/0017861 A1* 1/2009 Wu .................. H04W 52/246
455/522
2009/0257351 A1* 10/2009 Hande ................ H04W 28/02
370/236
(Continued)

FOREIGN PATENT DOCUMENTS

KR 101465901 B1 11/2014
WO WO-2017003508 A1 1/2017

OTHER PUBLICATIONS

"International Application Serial No. PCT/US2015/066744, International Search Report dated Apr. 11, 2016", 3 pgs.
(Continued)

*Primary Examiner* — Chi H Pham
*Assistant Examiner* — Weibin Huang
(74) *Attorney, Agent, or Firm* — Kowert, Hood, Munyon, Rankin & Goetzel, P.C.

(57) ABSTRACT

Embodiments of a system and method for configuring device to device connections in a Wireless Network are generally described herein. In some embodiments, an apparatus of User Equipment (UE) may include transceiver circuitry to receive a link weight and receive wideband symbols from a plurality of UEs. The apparatus may include processing circuitry to determine a channel gain and determine whether a predetermined transmission power is to be changed.

25 Claims, 6 Drawing Sheets

(51) Int. Cl.
*H04W 52/30* (2009.01)
*H04W 72/04* (2009.01)
*H04W 72/12* (2009.01)
*H04W 52/08* (2009.01)
*H04W 8/00* (2009.01)

(52) U.S. Cl.
CPC ..... *H04W 52/383* (2013.01); *H04W 72/0446* (2013.01); *H04W 72/12* (2013.01); *H04W 8/005* (2013.01); *H04W 52/08* (2013.01); *H04W 52/243* (2013.01); *H04W 52/245* (2013.01)

(58) Field of Classification Search
CPC ........ H04W 72/12; H04L 45/28; H04L 43/16; H04L 45/123; H04L 45/124; H04L 45/22; H04L 45/24; H04L 45/70; H04L 49/55; H04L 49/552
See application file for complete search history.

(56) References Cited

U.S. PATENT DOCUMENTS

| | | | | |
|---|---|---|---|---|
| 2011/0275382 A1* | 11/2011 | Hakola | ................ | H04W 24/10 455/452.2 |
| 2013/0329711 A1* | 12/2013 | Seo | ................ | H04J 11/0069 370/336 |
| 2014/0254401 A1* | 9/2014 | Talwar | ................ | H04W 24/10 370/252 |
| 2015/0327180 A1* | 11/2015 | Ryu | ................ | H04L 1/00 370/329 |
| 2016/0050635 A1* | 2/2016 | Choi | ................ | H04W 52/383 370/254 |
| 2016/0234789 A1* | 8/2016 | Oh | ................ | H04W 52/241 |
| 2016/0278022 A1* | 9/2016 | Miao | ................ | H04W 92/18 |
| 2016/0323922 A1* | 11/2016 | Park | ................ | H04W 24/10 |

OTHER PUBLICATIONS

"International Application Serial No. PCT/US2015/066744, Written Opinion dated Apr. 11, 2016", 4 pgs.

Jonghoo, Hong, et al., "Neighbor Device-Assisted Beacon Collision Detection Scheme for D2D Discovery", [Online] retrieved from the internet: <httpi//eventegg.com/ictc-2014/>, (Oct. 22-24, 2014).

"European Application Serial No. 15897376.8, Extended European Search Report dated Dec. 21, 2018", 9 pgs.

Hoang, Tuong Duc, et al., "Joint subchannel and power allocation for D2D communications in cellular networks", IEEE Wireless Communications and Networking Conference (WCNC), IEEE, (Apr. 6, 2014), 1338-1343.

* cited by examiner

DISTRIBUTED LINK SCHEDULING TECHNIQUE FOR DEVICE TO DEVICE COMMUNICATION

CLAIM OF PRIORITY

This patent application is a U.S. National Stage Filing under 35 U.S.C. 371 from International Application No. PCT/US2015/066744, filed on Dec. 18, 2015, and published as WO 2017/003508 on Jan. 5, 2017, which claims the benefit of priority of U.S. Provisional Patent Application Ser. No. 62/187,071, entitled "Distributed Link Scheduling Algorithm for Device-to-Device (D2D) Communication VIA Power Control," filed on Jun. 30, 2015, each of which are incorporated by reference herein in their entirety.

TECHNICAL FIELD

Embodiments pertain to wireless communications. Some embodiments relate to wireless networks including 3GPP (Third Generation Partnership Project) networks, 3GPP LTE (Long Term Evolution) networks, and 3GPP LTE-A (LTE Advanced) networks, although the scope of the embodiments is not limited in this respect. Some embodiments relate to link scheduling for device to device communication.

BACKGROUND

By 2020, it is estimated by some experts that there will be approximately seven trillion wireless devices serving billions of people. Such an explosive increase in the number of devices is often attributed to the advent of new Internet of Things (IoT) device types such as wearable and machine type communication (MTC) devices. Given the limited availability of bandwidth and marginal potential improvement of the spectral efficiency, capacity provisioning for this enormous number of devices through the conventional cellular communication structures presents some challenges.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
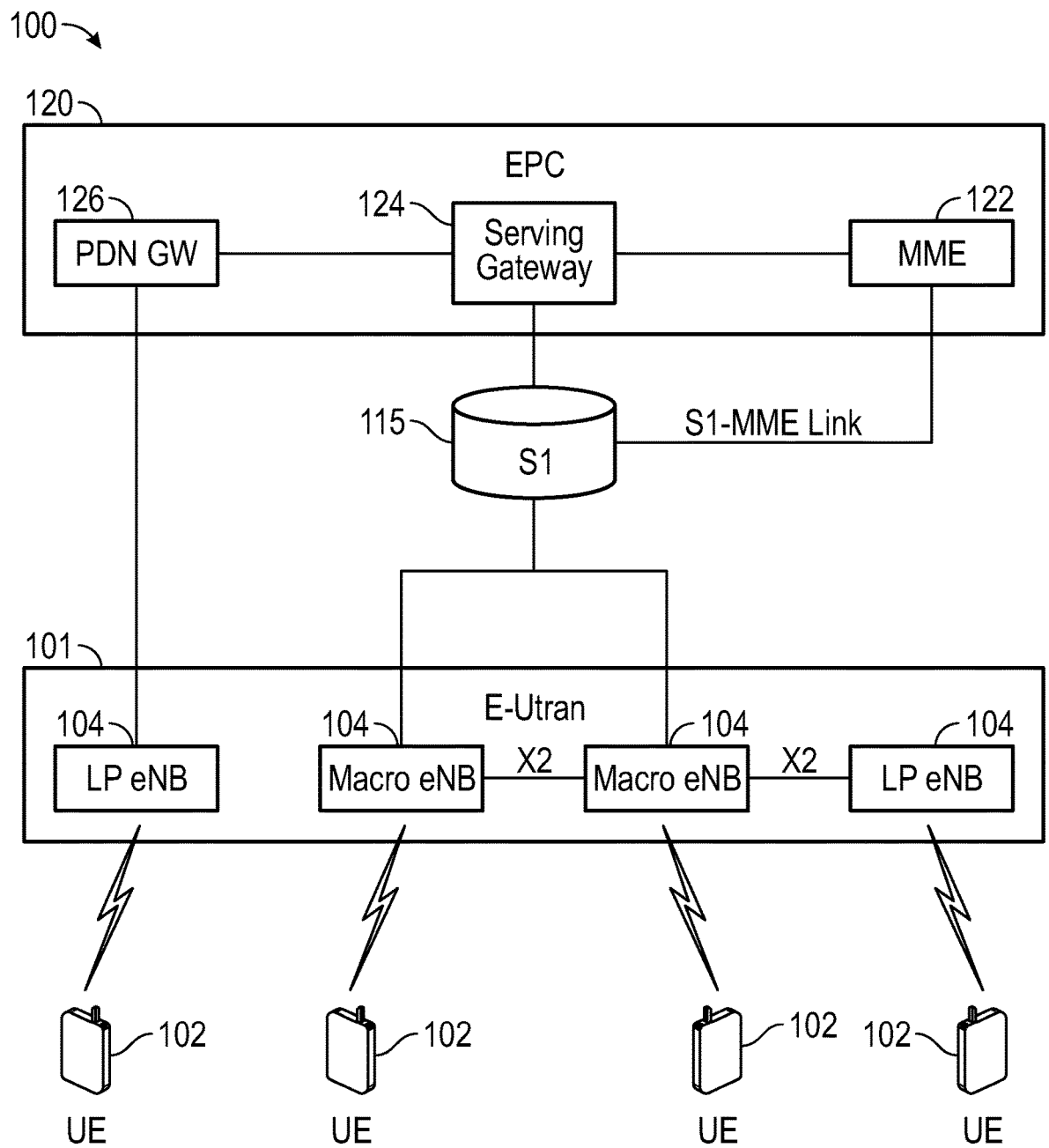
FIG. 1 illustrates a portion of an end-to-end network architecture of an LTE network with various components of the network in accordance with some embodiments.

FIG. 1 illustrates a portion of an end-to-end network architecture of an LTE network with various components of the network in accordance with some embodiments. The network 100 comprises a radio access network (RAN) (e.g., as depicted, the E-UTRAN or evolved universal terrestrial radio access network) 101 and the core network 120 (e.g., shown as an evolved packet core (EPC)) coupled together through an S1 interface 115. For convenience and brevity sake, only a portion of the core network 120, as well as the RAN 101, is shown.

The core network 120 includes mobility management entity (MME) 122, serving gateway (serving GW) 124, and packet data network gateway (PDN GW) 126. The RAN includes enhanced node B's (eNBs) 104 (which may operate as base stations) for communicating with user equipment (UE) 102. The eNBs 104 may include macro eNBs and low power (LP) eNBs.

The MME is similar in function to the control plane of legacy Serving GPRS Support Nodes (SGSN). The MME manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates a SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 100 including but not limited to RNC (radio network controller functions) such as radio bearer management, uplink and downlink dynamic radio resource management and data packet scheduling, and mobility management. In accordance with embodiments, UEs 102 may be configured to communicate OFDM communication signals with an eNB 104 over a multicarrier communication channel in accordance with an OFDMA communication technique. The OFDM signals may comprise a plurality of orthogonal subcarriers.

The S1 interface 115 is the interface that separates the RAN 101 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller, and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some embodiments, a downlink resource grid may be used for downlink transmissions from an eNB to a UE. The grid may be a time-frequency grid, called a resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements and in the frequency domain, this represents the smallest quanta of resources that currently can be allocated. There are several different physical downlink channels that are conveyed using such resource blocks. With particular relevance to this disclosure, two of these physical downlink channels are the physical downlink shared channel and the physical down link control channel.

The physical downlink shared channel (PDSCH) carries user data and higher-layer signaling to a UE 102 (FIG. 1). The physical downlink control channel (PDCCH) carries information about the transport format and resource allocations related to the PDSCH channel, among other things. It also informs the UE about the transport format, resource allocation, and H-ARQ information related to the uplink shared channel. Typically, downlink scheduling (assigning control and shared channel resource blocks to UEs within a cell) is performed at the eNB based on channel quality information fed back from the UEs to the eNB, and then the downlink resource assignment information is sent to a UE on the control channel (PDCCH) used for (assigned to) the UE.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of DCI and the channel condition. There may be four or more different PDCCH formats defined in LTE with different numbers of CCEs (e.g., aggregation level, L=1, 2, 4, or 8).

Figure 2:
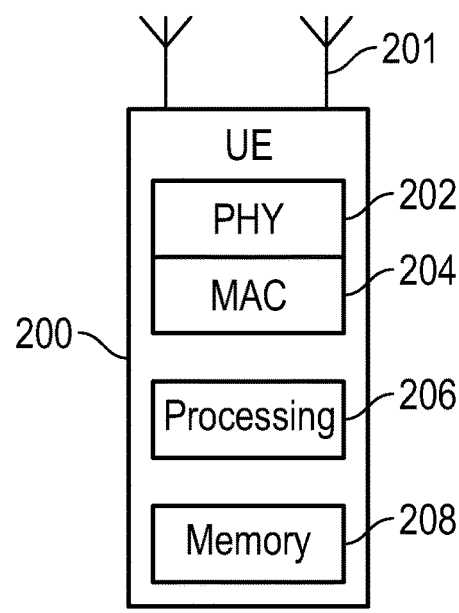
FIG. 2 illustrates a functional block diagram of a User Equipment (UE) in accordance with some embodiments.

FIG. 2 illustrates a functional block diagram of a UE in accordance with some embodiments. The UE 200 may be suitable for use as any one or more of the UEs 102 illustrated in FIG. 1. The UE 200 may include physical layer circuitry 202 for transmitting and receiving signals to and from eNBs 104 (FIG. 1) using one or more antennas 201. UE 200 may also include medium access control layer (MAC) circuitry 204 for controlling access to the wireless medium. UE 200 may also include processing circuitry 206 and memory 208 arranged to configure the various elements of the UE to perform the operations described herein.

In accordance with some embodiments, the MAC circuitry 204 may be arranged to contend for a wireless medium configure frames or packets for communicating over the wireless medium and the PHY circuitry 202 may be arranged to transmit and receive signals. The PHY 202 may include circuitry for modulation/demodulation, upconversion/downconversion, filtering, amplification, etc. In some embodiments, the processing circuitry 206 of the device 200 may include one or more processors. In some embodiments, two or more antennas may be coupled to the physical layer circuitry arranged for sending and receiving signals. The physical layer circuitry may include one or more radios for communication in accordance with cellular (e.g., LTE) and WLAN (e.g., IEEE 802.11) techniques. The memory 208 may be store information for configuring the processing circuitry 206 to perform operations for configuring and transmitting HEW frames and performing the various operations described herein.

In some embodiments, the UE may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable device, an Internet of Things device, or other device that may receive and/or transmit information wirelessly. In some embodiments, the UE may include one or more of a keyboard, a display, a non-volatile memory port, multiple antennas, a graphics processor, an application processor, speakers, and other mobile device elements. The display may be an LCD screen including a touch screen.

The one or more antennas 201 utilized by the UE 200 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and the different channel characteristics that may result between each of antennas and the antennas of a transmitting station. In some MIMO embodiments, the antennas may be separated by up to 1/10 of a wavelength or more.

Although the UE 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors may be configured with the instructions to perform the operations described herein.

In some embodiments, the UE 200 may be configured to receive OFDM communication signals over a multicarrier communication channel in accordance with an OFDMA communication technique. The OFDM signals may comprise a plurality of orthogonal subcarriers. In some broadband multicarrier embodiments, eNBs may be part of a broadband wireless access (BWA) network communication network, such as a Worldwide Interoperability for Microwave Access (WiMAX) communication network or a 3rd Generation Partnership Project (3GPP) Universal Terrestrial Radio Access Network (UTRAN) Long-Term-Evolution (LTE) or a Long-Term-Evolution (LTE) communication network, although the scope of the invention is not limited in this respect. In these broadband multicarrier embodiments, the UE 200 and the eNBs may be configured to communicate in accordance with an orthogonal frequency division multiple access (OFDMA) technique.

There have been some techniques to enable device to device (D2D) communication within the existing radio access technology. For example, the D2D functionality was introduced in the LTE system as part of 3rd Generation Partnership Project (3GPP) Release 12 for public safety purposes. In another example, Wi-Fi Direct was developed by the Wi-Fi Alliance to support some D2D communication over a Wi-Fi connection. In yet another example, Bluetooth was inherently designed for short-range D2D communication. In yet another example, a distributed link scheduling algorithm may be used for D2D communication with assistance from a centralized entity such as a base station (e.g., eNB) in a cellular network for frame synchronization, neighbor discovery, and connection ID management. In another example, a technique may enable proximity services (ProSe) to connect two or more devices. The devices connected using ProSe may, for example, directly connect, connect through a common eNB, such as without connecting to the larger network beyond the eNB, or the like. In yet another example, a ProSe connection may be used with a D2D connection in link scheduling techniques described herein.

When compared to conventional cellular communications, the gains of D2D communication may include proximity gain, hop gain, spatial resource reuse gain, or selection gain. For example, D2D communication may include proximity gain over conventional communication when a source-destination pair in a short distance has a high data rate and a low latency at a low power consumption. In another example, hop gain may include a source-destination pair within a communication distance of each other that may directly communicate rather than communicating through a base station. Spatial resource reuse gain may be more efficient in D2D communication. In yet another example, selection gain may include a source-destination pair that may choose to communicate directly or through a base station depending on the radio propagation environment.

Disclosed herein is a distributed power control technique, called PowerD2D. A frame structure and signaling may be used to support the PowerD2D. The PowerD2D may perform distributed link scheduling through iterative link transmission power updates. As an outcome of the proposed PowerD2D technique, some links may be completely turned off by setting their transmission power to zero. Other scheduled links may be assigned non-negative transmission power, to maximize a global objective function. In an example, a global objective may be to maximize aggregate long-term link throughput, aggregate long-term proportionally fair link throughput, or buffer stability. The PowerD2D technique is flexible enough to enforce any level of fairness between links in a distributed manner In an example implementation of the PowerD2D technique, a UE evaluates whether increasing a link rate by raising its power is sufficient enough to compensate for other UEs' rate loss due to increased interference power. The UE may perform the power control accordingly. The frame structure and singling may enable such evaluation by individual UEs for links in a distributed manner.

Using the PowerD2D technique may result in better performance achievement than existing distributed link scheduling techniques. For example, the PowerD2D technique causes over 100% throughput gain over another distributed link scheduling technique. Additionally, the PowerD2D technique supports distributed priority-rule enforcing, whereas a centralized technique involves intervention from a centralized entity for beyond randomized priority rule. The PowerD2D technique may have better controllability to exploit various operating points on the tradeoff between the throughput maximization and fairness enforcement amongst distributed users.

Figure 3:
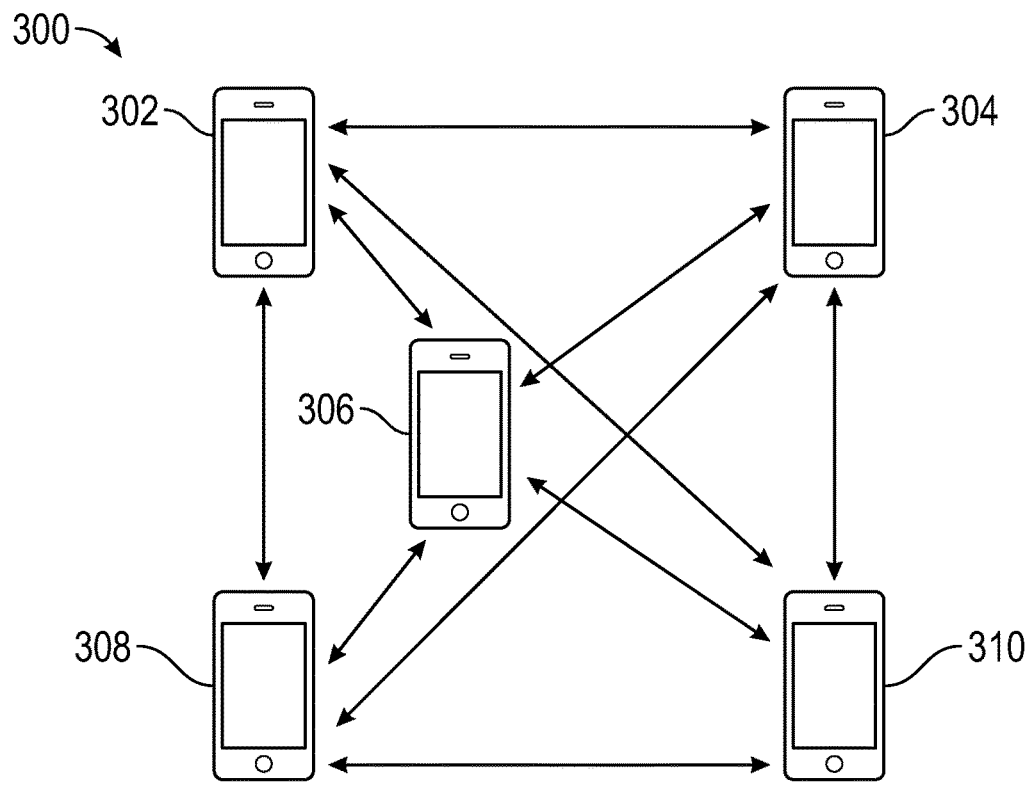
FIG. 3 illustrates a system including a plurality of UEs for device to device communication in accordance with some embodiments.

FIG. 3 illustrates a system 300 including a plurality of UEs (e.g., 302-310) for D2D communication in accordance with some embodiments. The system 300 may use distributed link scheduling for D2D communications. The system 300 illustrates examples of links between different UEs. For example, in FIG. 3, potential links shown between each combination of UEs 302-310. In an example, different combinations of links for UEs may be used. For example, D2D communication may use any combination of links among the various UEs, such as a single link between two UEs 302 and 308, a link in from the UE 302 and a link out to the UE 304 for the UE 306, etc. A link in D2D communication may be used for and scheduled for unilateral communication or for bilateral communication. A link may represent a connection between two UEs. In an example, the UEs 302-310 may communicate with each other without a central entity involved.

The UEs in system 300 may perform communication setup actions prior to performing a scheduling technique. In an example, a setup action may include performing timing synchronization between UE 302 and UE 304. The timing synchronization may be achieved by the use of GPS, a network provided D2D synchronization signal (D2DSS), which may be described in a standard such as LTE Release 12, or another type of timing source. In another example, a setup action may include peer discovery and source-destination pairing. For example, discovery and pairing may be performed on a longer time scale than distributed link scheduling (e.g., predetermined discovery and pairing, discovery and pairing determined by a centralized entity, etc.).

In an example, an analog tone-based signaling may be used to perform distributed link scheduling. Other types of signaling mechanisms may be used, such as any code-based or packet-based signaling mechanism. In the tone-based signaling example, a link may be associated with a unique tone, specified in two-dimensional frequency and time domain. This tone assignment may be locally non-overlapping with neighboring nodes within the reception range of each other. For example, in system 300, UEs 302-310 may be within reception range of each other. A unique tone may be assigned to each of the links between each of the UEs 302-310 when the links are active. For a UE not pictured, outside the reception range of the UEs in system 300, the UE not pictured may have a link with another UE not pictured with overlapping tone assignment to a link in system 300.

In an example, distributed scheduling may be used for system 300 when connecting the UEs 302-310 through a base stations is not conceivable (e.g., signaling overhead would be overwhelming, inefficient, or configuration costs may be too high).

Figure 4:
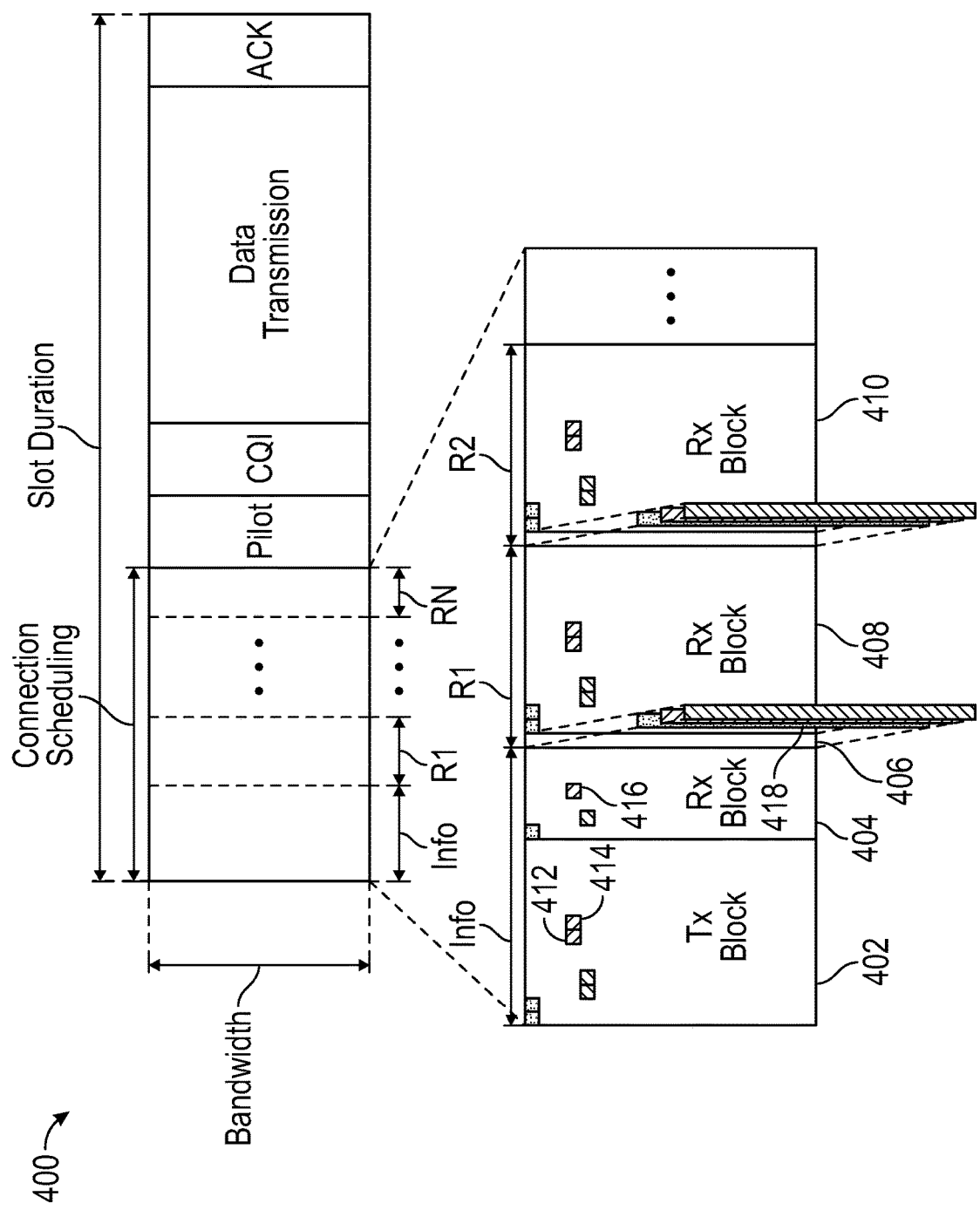
FIG. 4 illustrates a frame structure for configuring distributed device to device communications in accordance with some embodiments.

FIG. 4 illustrates a frame structure 400 for configuring distributed D2D communications in accordance with some embodiments. The frame comprises multiple subblocks, which are explained below in detail.

In an example, a slot or frame begins with an information exchange block for connection scheduling. A source node (e.g., a UE) may be assigned two consecutive tones in a transmission (Tx) block 402 as shown in the frame structure 400. If a source node has data to send to a paired destination node, the source node may allocate a preconfigured amount of power on the first tone 412 as an indication that it has data to send. Destination nodes may be in a listening mode during the Tx-block 402 and source nodes may be transmitting analog tones with a known power. Neighboring destination nodes, including the intended one, may interpret the channel gain from the neighboring source nodes to the neighboring destination nodes. A destination node far away from a transmitter may interpret that the channel gain is very low or the transmitter is not sending the tone signal, and may disregard the transmission or transmissions. The source node that indicated its intention to transmit may transmit a second tone 414 with transmit power embedding its link weight information. For example, the source of link 1 may set its transmission power for the given link weight $w_l$ as $P_l = KP_{max}/w_l$, where K is a preconfigured constant and $P_{max}$ is the preconfigured maximum transmission power for D2D communication. A destination node may know the channel gain $G_{ll}$ between its source node and itself from the first tone 412 signaling, and it may interpret $w_l$ from the received power on the second tone 414. The two tones (e.g., 412 and 414, and other tones shown in block 402) assigned to each source may or may not be adjacent to each other in time or frequency.

A destination node may respond by sending an indication (in Rx block 404) using an assigned tone 416 with a known power level in response to the corresponding source node sending its tones 412 and 414. From the received power, the source node over a link l, for example, may interpret the channel gain $G_{lk}$ to the destination node of link k using channel reciprocity.

The PowerD2D scheduling technique includes a technical solution to the following weighted sum rate maximization problem in each time slot according to the following equation:

$$\max \sum_l w_l(t) R_l(t), \qquad \text{Equation (1)}$$

In equation (1), $w_l(t)$ is the weight of link l and $R_l(t)$ is the allocated rate over link l at time slot t. The rate allocation is constrained in the sense that it lies in the feasible rate region, which may be determined from the following equation:

$$\vec{R}(t) = \vec{R}(\vec{S}(t), \vec{P}(t)) \in \Gamma_{\vec{S}} \qquad \text{Equation (2)}$$

In equation (2), $\Gamma_{\vec{S}}$ is the feasible region of rates at given channel state vector $\vec{S}$ by considering the possible power allocation vectors $\vec{P}$. The rate over each link may be a nonlinear function of the received signal-to-interference-plus-noise-ratio (SINR) at the corresponding destination node. The SINR at time slot t may be a function of the power allocation $\vec{P}(t)$ and channel states $\vec{S}(t)$ at time slot t.

The weight $w_l(t)$ over the links may be a predetermined value. For example, the link weight of 1 may be the size of the queue at the source node at time slot t. Using Lyapunov control theory, solving the weighted sum rate maximization problem in each time slot may provide maximum queueing stability. A queue may be said to be stable if the queue reaches a steady state and does not drift to infinity. In another example, the weight $w_l(t)$ may be of the form $1/(\bar{R}_l^\alpha)$ where $\bar{R}^t$ is the time-average throughput over link l. The constant α controls rate fairness amongst links Using gradient-based resource allocation theory, as α approaches zero, the sum of the long-term average throughput may be maximized. When α equals one, proportionally fair long-term rate allocation is achieved. As α increases, the fairness is improved at the cost of reduced total throughput, and as α goes to infinity, the throughput allocation becomes max-min fair. Other values for the link weight may be used.

Using assigned link weights, the PowerD2D technique may include solving the above weighted sum rate maximization problem using an iterative gradient method. The gradient of a function may indicate the direction of the most rapid increase of the function value. In an example, the PowerD2D technique updates power allocation over distributed links in the gradient direction that maximizes the objective function. The PowerD2D technique may include an iterative process to repeatedly update power allocation over distributed links in successive gradient directions. In each iteration, the PowerD2D technique may determine the gradient direction, which may change as the power allocation is changed. A source node may use a gradient of the objective function over its own transmission power to determine whether to increase its transmission power. The gradient of the objective function over the transmission power $P_l$ of the source node of link l may be determined from the following equation:

$$\nabla_l = \underbrace{w_l s_l \frac{G_{ll}}{\sum_{j \neq l} P_j G_{jl} + n_l}}_{\text{momentum of my rate increase}} - \underbrace{\sum_{j \neq l} w_j s_j \frac{P_j G_{jj} G_{lj}}{\left(\sum_{k \neq j} P_k G_{kj} + n_j\right)^2}}_{\text{momentum of others' rate decrease}} \quad \text{Equation (3)}$$

In equation (3), $s_k$ is the slope of the rate function at a specified SINR value over link k, which is dependent on the power allocation vector $\vec{P}$ and channel states $\vec{S}$, which includes the channel gain between all the sources and destinations, which is $G_{ij}, \forall i,j$. The first term in the gradient is used to determine the momentum of a rate increase over link l by increasing the transmission power $P_l$. The second them is used to determine the momentum of an aggregated decrease of rates over links other than link l when the transmission power $P_l$ is increased. The first term is then compared to the second term to determine which is greater. When the first term is greater than the second term, the gradient will be positive, indicating that the source node of link l is to increase its transmission power. In another example, a positive gradient may indicate that a source node is to keep its transmission power the same, such as when the transmission power is at a maximum transmission power. When the second term is greater than the first term, the gradient will be negative. When the gradient is negative, the source node may decrease its transmission power or keep its transmission power the same, if for example, the transmission power is at zero. In an example, the PowerD2D technique includes, in each power adjustment, determining at each source node whether to increase or decrease its power, based on whether the gradient is positive or negative. By iteratively updating the transmission power vector $\vec{P}$, the distributed power allocation may approach an optimal allocation.

In an example, a LTE rate function may not be differentiable due to the discreteness of modulation and coding levels. An approximation may be used to implement the PowerD2D technique on the discrete LTE rate function. For example, using a noisy-channel coding scheme, such as a Shannon-Hartley scheme may be used to determine the bounded maximum achievable rate with the cost of inaccuracy from LTE (or any other system on which the designed PowerD2D communication technique runs) rate function. In another example, a piecewise linear approximation of the LTE rate function may be created by linearly interpolating the discrete transition points of the rate function. The approximation then may be used in the PowerD2D technique. The transition points may include the minimum signal quality meeting the target packet error rate for the set of modulation and coding schemes.

As shown in the frame structure 400, the interactive power control operation between distributed sources and destinations over the connection scheduling subblocks from $R_1$ (block 408) to $R_N$ are described below. At the start of a power control round, source nodes that indicated an intent to transmit data (at block 402) during the information exchange subblock may transmit a wide-band pilot signal during block 406 simultaneously over one or more OFDM symbols with a duration depending on the system design. From the superposition of the received wide-band pilot signals of Rx block 406, a destination node may estimate a SINR over the subbands (or subcarriers) for a link connecting a source node to the destination node. The destination node, for example the destination of link l, may estimate the intended link channel strength $P_l G_{ll}$ averaged over subbands, the aggregate interference plus noise power $\Sigma_{(j \neq l)}(P_j G_{jl}++n_l)$ averaged over subbands, and the SINR over the subbands. From these estimations, the destination node may determine the effective SINR using, for example, exponential effective SINR mapping (ESM), mean mutual information per-bit (MMIB) ESM, or any other similar method. At the computed effective SINR, the destination of link l may estimate the slope of the rate function si using the chosen rate approximation method as discussed earlier.

Destination nodes may signal two consecutive tones at Rx block 408 (either physically or logically) for the computation of the gradients in equation (3) for a corresponding source node as well as for the other neighboring source nodes. In an example, the first tone may be transmitted with the values of $w_l s_l P_l G_{ll}$ embedded in the tone at a predetermined power and the second tone may be transmitted with the values of $\Sigma_{(j \neq l)}(P_j G_{jl}+n_l)$ embedded in the tone at the predetermined power. A source node may compute the gradient of its power control after receiving the information signaled from the neighboring destination nodes including its own. For example, the source node of link l knows its own transmit power $P_l$ and, thus, it may compute the first term in equation (3) from the information signaled by its own destination node. Since the source node of link l also acquired the cross channel gain $G_{lj}, \forall j, j \neq l$, from itself to the destination nodes of other neighboring links, it may also compute the second term in equation (3) from the information signaled by the neighboring destination nodes.

After computing the gradient of the global objective function (e.g., equation (1)), each source node increases its power if the gradient is positive and decreases its power if the gradient is negative. A positive gradient of a certain link implies that its weighted rate increase, by increasing the power over the link, is large enough to compensate others' weighted rate reduction due to increased interference from the corresponding link In response to determining the gradient is positive, the source node may increase the power over the link, resulting in an increase of the global objective function (e.g., equation (1)). The negative gradient case can also be understood in parallel. The technique may be iterated by sending a second set of wideband signals from the source nodes and sending a second set of consecutive tones at Rx block 410 for the computation of the gradients in equation (3) for a corresponding source node as well as for the other neighboring source nodes. The technique may be further iterated up to an end block $R_N$. In each iteration, the previously determined transmission power changes may be used to transmit the signals such that the destination nodes may determine changes to the new transmission powers. As the process iterates, the transmission powers of various source nodes are updated and the overall distributed connection system is optimized for the frame and the links. In an example a link may be optimized at a maximum transmission power or a zero transmission power. For example, certain links may drop out and not transmit (i.e. go to zero power) and certain other links may go to a maximum transmission power. The source nodes for links at a maximum transmission power may continue to send and receive in the iterative process, and in some cases may decrease power. In an example, the source nodes for links that drop to zero transmission power do not continue to send tones in the iterative process and may be eliminated from consideration for that frame.

In an example, changing the power (e.g., increasing or decreasing the power) may use a fixed or a diminishing step size of any form. For example, the power may be halved when decreasing and doubled when increasing. In another example, when increasing the power, the power may be increased to a maximum transmission power. In yet another example, satisfying a set of conditions for the gradient function may guarantee the convergence of the iterative technique. For example, satisfying the Armijo rule, which is an inequality using a current best guess and a new search direction, to ensure that a step sufficiently moves the objective function. The power control of the PowerD2D algorithm may run over a finite number of rounds, and may use the set of conditions to ensure convergence over the finite number of rounds (e.g., up to $R_N$). The power update step size may be designed in conjunction with the number of iterations to ensure convergence. In an example, the PowerD2D technique may converge with any number of rounds fewer than 10 rounds (e.g., up to $R_N=R_{10}$) when the power update step size rule is given by $P_{init}/\sqrt{n}$, where $P_{init}$ is the initial transmit power level and n is the current power update round number.

Figure 5:
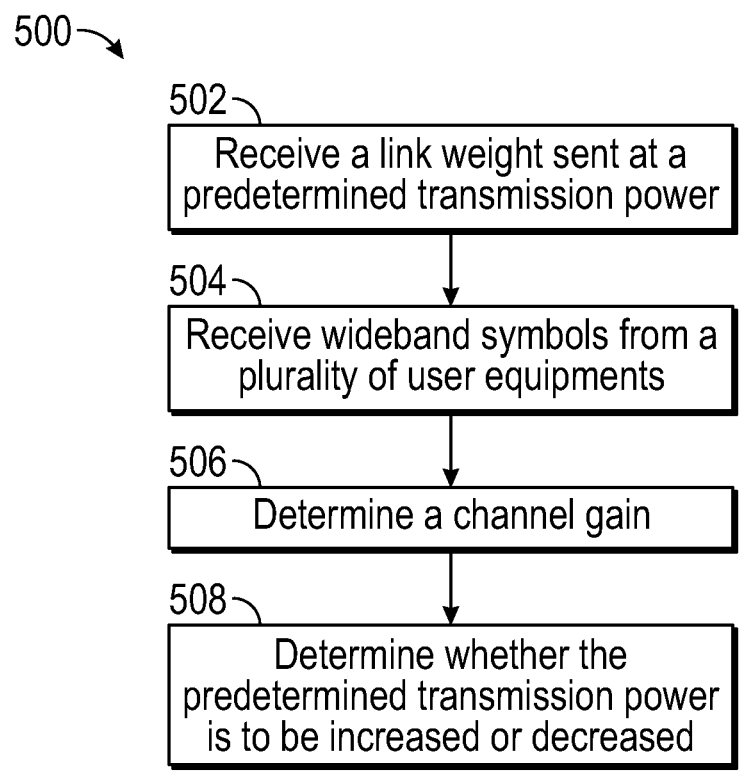
FIG. 5 is a flowchart illustrating a technique for scheduling distributed device to device communications in accordance with some embodiments.

FIG. 5 is a flowchart illustrating a technique 500 for scheduling distributed device to device communications in accordance with some embodiments. Technique 500 includes an operation 502 to receive a link weight sent at a predetermined transmission power. In an example, a first symbol may be received at a UE prior to receiving the link weight. The first symbol may indicate that data is to be sent over a link corresponding to the link weight. The link weight may be received in a second symbol. The first and second symbols may be received from a second UE at a predetermined transmission power. In an example, the first symbol and the second symbol are analog tone-based signals with unique tones specified in two-dimensional frequency and time domains In another example, the predetermined transmission power is a maximum transmission power. In yet another example, the predetermined transmission power is not a maximum transmission power and the link weight is proportional to a maximum transmission power for the link divided by the predetermined transmission power.

Technique 500 includes an operation 504 to receive wideband symbols from a plurality of UEs. The wideband symbols may be a plurality of wideband symbols received from a plurality of UEs, including the second UE. The plurality of wideband symbols may have corresponding signal strengths and interference levels that may be determined by the UE. Technique 500 includes an operation 506 to determine a channel gain for the link. The channel gain for the link may be determined using the predetermined transmission power and an actual received transmission power of the second symbol over the link.

Technique 500 includes an operation 508 to determine whether the predetermined transmission power is to be increased or decreased. In an example, operation 508 may include using a gradient function to compare the link weight for the link and the channel gain for the link to the signal strengths and the interference levels of the plurality of wideband symbols. When the gradient function is positive, the predetermined transmission power may be increased. When the gradient function is negative, the predetermined transmission power may be decreased. When the predetermined transmission power is a maximum transmission power, it may not be increased, even if the gradient function is positive.

In an example, the gradient function is used to maximize an objective function, the objective function equaling a summation of a plurality of link weights multiplied by a plurality of rate allocations for a specified transmission time, the plurality of link weights and the plurality of rate allocations corresponding to links for the plurality of UEs. The rate allocations may be determined using received signal to interference plus noise ratios (SINRs), power allocations, and channel states. In another example, the gradient function compares a momentum of an increase in power for the predetermined transmission power of the second UE to a momentum of decreases in power of the plurality of UEs other than the second UE.

The operation 508 may include determining that the predetermined transmission power of the second UE is to be increased to an increased transmission power. The technique 500 may include an operation to send a third symbol to the second UE indicating the increased transmission power. In response, the UE may receive a second plurality of wideband symbols from the plurality of UEs including the second UE, the second plurality of wideband symbols having corresponding signal strengths and interference levels. In an example, to the technique 500 may be iterated by determining whether the increased transmission power of the second UE is to be increased or decreased by using the gradient function to compare the link weight for the link and the channel gain for the link to the signal strengths and the interference levels of the second plurality of wideband symbols. The UE may receive the data indicated in the first symbol at the increased transmission power. In another example, the predetermined transmission power may be received in a first subframe of a frame. The third symbol indicates the increased transmission power and may be sent in a second subframe of the frame. In yet another example, the plurality of wideband signals are received in a third subframe of the frame. In an example, the UE may determine that the predetermined transmission power of the second UE is to be decreased to a decreased transmission power. In response, the UE may send a fourth symbol to the second UE indicating the decreased transmission power, wherein the predetermined transmission power is received in a first subframe of a frame and the fourth symbol is sent in a second subframe of the frame.

Figure 6:
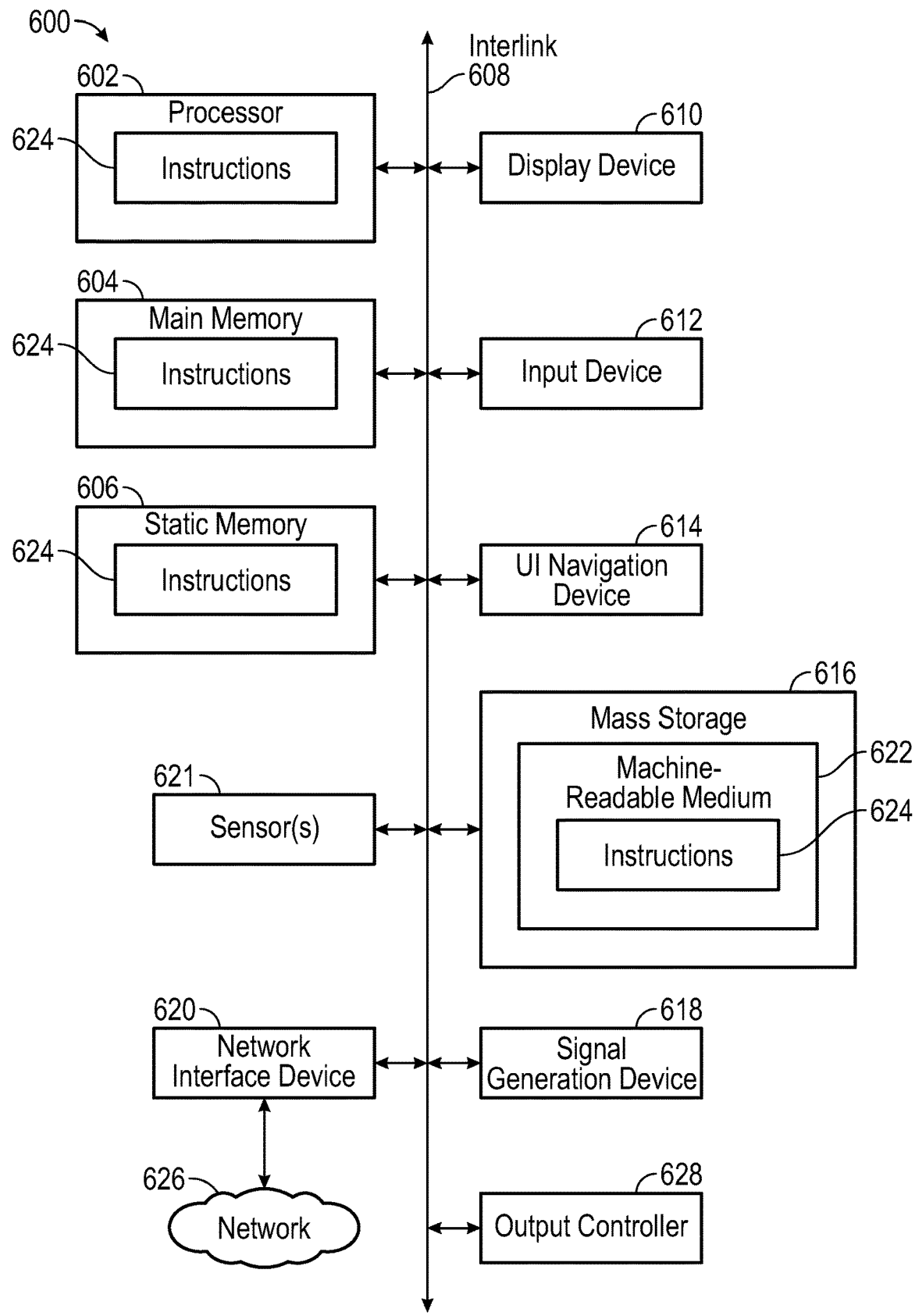
FIG. 6 illustrates generally an example of a block diagram of a machine upon which any one or more of the techniques (e.g., methodologies) discussed herein may perform in accordance with some embodiments.

FIG. 6 illustrates generally an example of a block diagram of a machine 600 upon which any one or more of the techniques (e.g., methodologies) discussed herein may perform in accordance with some embodiments. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, alphanumeric input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 that is non-transitory on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

Figure 7:
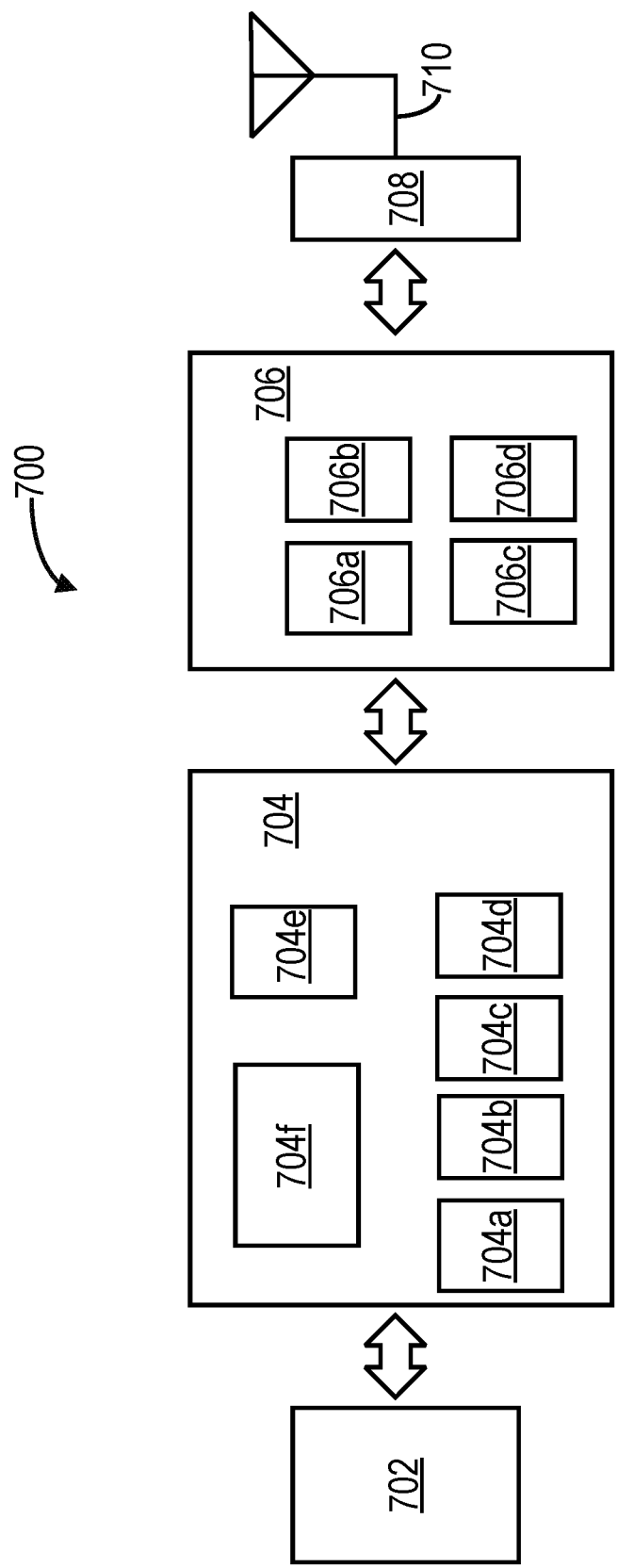
FIG. 7 illustrates, for one embodiment, example components of a User Equipment (UE) device.

FIG. 7 illustrates, for one embodiment, example components of a User Equipment (UE) device 700. As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein may be implemented into a system using any suitably configured hardware and/or software. In some embodiments, the UE device 700 may include application circuitry 702, baseband circuitry 704, Radio Frequency (RF) circuitry 706, front-end module (FEM) circuitry 708 and one or more antennas 710, coupled together at least as shown.

The application circuitry 702 may include one or more application processors. For example, the application circuitry 702 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 704 may include circuitry such as, but not limited to, one or more single-core or multi-core processors. The baseband circuitry 704 may include one or more baseband processors and/or control logic to process baseband signals received from a receive signal path of the RF circuitry 706 and to generate baseband signals for a transmit signal path of the RF circuitry 706. Baseband processing circuitry 704 may interface with the application circuitry 702 for generation and processing of the baseband signals and for controlling operations of the RF circuitry 706. For example, in some embodiments, the baseband circuitry 704 may include a second generation (2G) baseband processor 704a, third generation (3G) baseband processor 704b, fourth generation (4G) baseband processor 704c, and/or other baseband processor(s) 704d for other existing generations, generations in development or to be developed in the future (e.g., fifth generation (5G), 6G, etc.). The baseband circuitry 704 (e.g., one or more of baseband processors 704a-d) may handle various radio control functions that enable communication with one or more radio networks via the RF circuitry 706. The radio control functions may include, but are not limited to, signal modulation/demodulation, encoding/decoding, radio frequency shifting, etc. In some embodiments, modulation/demodulation circuitry of the baseband circuitry 704 may include Fast-Fourier Transform (FFT), precoding, and/or constellation mapping/demapping functionality. In some embodiments, encoding/decoding circuitry of the baseband circuitry 704 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 704 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 704e of the baseband circuitry 704 may be configured to run elements of the protocol stack for signaling of the PHY, MAC, RLC, PDCP and/or RRC layers. In some embodiments, the baseband circuitry may include one or more audio digital signal processor(s) (DSP) 704f. The audio DSP(s) 704f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 704 and the application circuitry 702 may be implemented together such as, for example, on a system on a chip (SOC).

In some embodiments, the baseband circuitry 704 may provide for communication compatible with one or more radio technologies. For example, in some embodiments, the baseband circuitry 704 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 704 is configured to support radio communications of more than one wireless protocol may be referred to as multi-mode baseband circuitry.

RF circuitry 706 may enable communication with wireless networks using modulated electromagnetic radiation through a non-solid medium. In various embodiments, the RF circuitry 706 may include switches, filters, amplifiers, etc. to facilitate the communication with the wireless network. RF circuitry 706 may include a receive signal path which may include circuitry to down-convert RF signals received from the FEM circuitry 708 and provide baseband signals to the baseband circuitry 704. RF circuitry 706 may also include a transmit signal path which may include circuitry to up-convert baseband signals provided by the baseband circuitry 704 and provide RF output signals to the FEM circuitry 708 for transmission.

In some embodiments, the RF circuitry 706 may include a receive signal path and a transmit signal path. The receive signal path of the RF circuitry 706 may include mixer circuitry 706a, amplifier circuitry 706b and filter circuitry 706c. The transmit signal path of the RF circuitry 706 may include filter circuitry 706c and mixer circuitry 706a. RF circuitry 706 may also include synthesizer circuitry 706d for synthesizing a frequency for use by the mixer circuitry 706a of the receive signal path and the transmit signal path. In some embodiments, the mixer circuitry 706a of the receive signal path may be configured to down-convert RF signals received from the FEM circuitry 708 based on the synthesized frequency provided by synthesizer circuitry 706d. The amplifier circuitry 706b may be configured to amplify the down-converted signals and the filter circuitry 706c may be a low-pass filter (LPF) or band-pass filter (BPF) configured to remove unwanted signals from the down-converted signals to generate output baseband signals. Output baseband signals may be provided to the baseband circuitry 704 for further processing. In some embodiments, the output baseband signals may be zero-frequency baseband signals, although this is not a requirement. In some embodiments, mixer circuitry 706a of the receive signal path may comprise passive mixers, although the scope of the embodiments is not limited in this respect.

In some embodiments, the mixer circuitry 706a of the transmit signal path may be configured to up-convert input baseband signals based on the synthesized frequency provided by the synthesizer circuitry 706d to generate RF output signals for the FEM circuitry 708. The baseband signals may be provided by the baseband circuitry 704 and may be filtered by filter circuitry 706c. The filter circuitry 706c may include a low-pass filter (LPF), although the scope of the embodiments is not limited in this respect.

In some embodiments, the mixer circuitry 706a of the receive signal path and the mixer circuitry 706a of the transmit signal path may include two or more mixers and may be arranged for quadrature downconversion and/or upconversion respectively. In some embodiments, the mixer circuitry 706a of the receive signal path and the mixer circuitry 706a of the transmit signal path may include two or more mixers and may be arranged for image rejection (e.g., Hartley image rejection). In some embodiments, the mixer circuitry 706a of the receive signal path and the mixer circuitry 706a may be arranged for direct downconversion and/or direct upconversion, respectively. In some embodiments, the mixer circuitry 706a of the receive signal path and the mixer circuitry 706a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 706 may include analog-to-digital converter (ADC) and digital-to-analog converter (DAC) circuitry and the baseband circuitry 704 may include a digital baseband interface to communicate with the RF circuitry 706.

In some dual-mode embodiments, a separate radio IC circuitry may be provided for processing signals for each spectrum, although the scope of the embodiments is not limited in this respect.

In some embodiments, the synthesizer circuitry 706d may be a fractional-N synthesizer or a fractional N/N+1 synthesizer, although the scope of the embodiments is not limited in this respect as other types of frequency synthesizers may be suitable. For example, synthesizer circuitry 706d may be a delta-sigma synthesizer, a frequency multiplier, or a synthesizer comprising a phase-locked loop with a frequency divider.

The synthesizer circuitry 706d may be configured to synthesize an output frequency for use by the mixer circuitry 706a of the RF circuitry 706 based on a frequency input and a divider control input. In some embodiments, the synthesizer circuitry 706d may be a fractional N/N+1 synthesizer.

In some embodiments, frequency input may be provided by a voltage controlled oscillator (VCO), although that is not a requirement. Divider control input may be provided by either the baseband circuitry 704 or the applications processor 702 depending on the desired output frequency. In some embodiments, a divider control input (e.g., N) may be determined from a look-up table based on a channel indicated by the applications processor 702.

Synthesizer circuitry 706d of the RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 706d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 706 may include an IQ/polar converter.

FEM circuitry 708 may include a receive signal path which may include circuitry configured to operate on RF signals received from one or more antennas 710, amplify the received signals and provide the amplified versions of the received signals to the RF circuitry 706 for further processing. FEM circuitry 708 may also include a transmit signal path which may include circuitry configured to amplify signals for transmission provided by the RF circuitry 706 for transmission by one or more of the one or more antennas 710.

In some embodiments, the FEM circuitry 708 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 706). The transmit signal path of the FEM circuitry 708 may include a power amplifier (PA) to amplify input RF signals (e.g., provided by RF circuitry 706), and one or more filters to generate RF signals for subsequent transmission (e.g., by one or more of the one or more antennas 710.

In some embodiments, the UE device 700 may include additional elements such as, for example, memory/storage, display, camera, sensor, and/or input/output (I/O) interface.

Various Notes & Examples

Each of these non-limiting examples may stand on its own, or may be combined in various permutations or combinations with one or more of the other examples.

Example 1 is an apparatus of User Equipment (UE) configured for device-to-device (D2D) communication, the apparatus comprising: transceiver circuitry to: receive a first symbol and a second symbol from a second UE over a link, the first symbol indicating data to be sent and the second symbol indicating a link weight for the link; receive a plurality of wideband symbols from a plurality of UEs including the second UE, the plurality of wideband symbols having corresponding signal strengths and interference levels; processing circuitry to: determine a channel gain for the link based on predetermined transmission power and a received transmission power of the second symbol over the link; and determine whether the predetermined transmission power is to be changed based on a comparison of the link weight for the link and the channel gain for the link to the signal strengths and the interference levels of the plurality of wideband symbols.

In Example 2, the subject matter of Example 1 optionally includes, wherein the first and second symbols are sent by the second UE at the predetermined transmission power, and wherein the processing circuitry is to determine whether the predetermined transmission power is to be changed based on the comparison includes using a gradient function.

In Example 3, the subject matter of Example 2 optionally includes, wherein the gradient function is used to maximize an objective function, the objective function equaling a summation of a plurality of link weights multiplied by a plurality of rate allocations for a specified transmission time, the plurality of link weights and the plurality of rate allocations corresponding to links for the plurality of UEs.

In Example 4, the subject matter of any one or more of Examples 2-3 optionally include, wherein the transceiver circuitry is to receive a data packet over the link from the second UE at the increased transmission power during a data transmission subframe of the frame.

In Example 5, the subject matter of any one or more of Examples 2-4 optionally include, wherein the gradient function compares a momentum of an increase to the predetermined transmission power to a momentum of decreases in power of the plurality of UEs other than the second UE.

In Example 6, the subject matter of any one or more of Examples 1-5 optionally include, wherein the processing circuitry is to determine that the predetermined transmission power is to be increased to an increased transmission power and wherein the transceiver circuitry is to send a third symbol to the second UE indicating the increased transmission power.

In Example 7, the subject matter of Example 6 optionally includes, wherein the transceiver circuitry is to receive a second plurality of wideband symbols from the plurality of UEs including the second UE, the second plurality of wideband symbols having corresponding signal strengths and interference levels.

In Example 8, the subject matter of Example 7 optionally includes, wherein the processing circuitry is to determine whether the increased transmission power of the second UE is to be increased or decreased by comparing the link weight for the link and the channel gain for the link to the signal strengths and the interference levels of the second plurality of wideband symbols.

In Example 9, the subject matter of any one or more of Examples 6-8 optionally include, wherein the transceiver circuitry is to receive the data indicated in the first symbol at the increased transmission power.

In Example 10, the subject matter of any one or more of Examples 6-9 optionally include, wherein the predetermined transmission power is received in a first subframe of a frame, the third symbol indicating the increased transmission power is sent in a second subframe of the frame, and the plurality of wideband signals are received in a third subframe of the frame.

In Example 11, the subject matter of any one or more of Examples 1-10 optionally include, wherein the rate allocations are determined using received signal to interference plus noise ratios (SINRs), power allocations, and channel states.

In Example 12, the subject matter of any one or more of Examples 1-11 optionally include, wherein the predetermined transmission power is a maximum transmission power.

In Example 13, the subject matter of any one or more of Examples 1-12 optionally include, wherein the processing circuitry is to determine that the predetermined transmission power is to be decreased to a decreased transmission power and wherein the transceiver circuitry is to send a fourth symbol to the second UE indicating the decreased transmission power, wherein the predetermined transmission power is received in a first subframe of a frame and the fourth symbol is sent in a second subframe of the frame.

In Example 14, the subject matter of any one or more of Examples 1-13 optionally include, wherein the first symbol and the second symbol are analog tone-based signals with unique tones specified in two-dimensional frequency and time domains.

In Example 15, the subject matter of any one or more of Examples 1-14 optionally include, wherein the processing circuitry includes a baseband processor configured to decode the first symbol and the second symbol.

In Example 16, the subject matter of any one or more of Examples 1-15 optionally include-15, further comprising one or more antennas coupled to the transceiver circuitry.

Example 17 is an apparatus of User Equipment (UE) configured for device-to-device (D2D) communication, the apparatus comprising: transceiver circuitry to: receive a first symbol and a second symbol sent at a predetermined transmission power directly from a second UE over a D2D link, the first symbol indicating data to be sent and the second symbol indicating a link weight for the link; receive a plurality of wideband symbols from a plurality of UEs including the second UE, the plurality of wideband symbols having corresponding signal strengths and interference levels; processing circuitry to: determine a channel gain for the D2D link using the predetermined transmission power and a received transmission power of the second symbol over the D2D link; and determine that the predetermined transmission power is to be changed to an increased transmission power by determining that a gradient function indicates that an increase in the predetermined transmission power maximizes an objective function.

In Example 18, the subject matter of Example 17 optionally includes, wherein the transceiver circuitry is to send a third symbol to the second UE indicating the increased transmission power.

In Example 19, the subject matter of Example 18 optionally includes, wherein the transceiver circuitry is to receive a second plurality of wideband symbols from the plurality of UEs including the second UE, the second plurality of wideband symbols having corresponding signal strengths and interference levels.

In Example 20, the subject matter of Example 19 optionally includes, wherein the processing circuitry is to determine that the gradient function indicates that the increase in the predetermined transmission power maximizes the objective function by using the gradient function to compare the link weight for the D2D link and the channel gain for the D2D link to the signal strengths and the interference levels of the second plurality of wideband symbols.

In Example 21, the subject matter of any one or more of Examples 18-20 optionally include, wherein the transceiver circuitry is to receive the data indicated in the first symbol at the increased transmission power.

In Example 22, the subject matter of any one or more of Examples 18-21 optionally include, wherein the predetermined transmission power is received in a first subframe of a frame, the third symbol indicating the increased transmission power is sent in a second subframe of the frame, and the plurality of wideband signals are received in a third subframe of the frame.

Example 23 is a computer-readable storage medium that stores instructions for execution by one or more processors of a user equipment (UE) to configure the UE to perform operations to: receive a first symbol and a second symbol from a second UE over a link, the first symbol indicating data to be sent and the second symbol indicating a link weight for the link; receive a plurality of wideband symbols from a plurality of UEs including the second UE, the plurality of wideband symbols having corresponding signal strengths and interference levels; processing circuitry to: determine a channel gain for the link based on predetermined transmission power and a received transmission power of the second symbol over the link; and determine whether the predetermined transmission power is to be changed based on a comparison of the link weight for the link and the channel gain for the link to the signal strengths and the interference levels of the plurality of wideband symbols.

In Example 24, the subject matter of Example 23 optionally includes, wherein the first and second symbols are sent by the second UE at the predetermined transmission power, and wherein the processing circuitry is to determine whether the predetermined transmission power is to be changed based on the comparison includes using a gradient function.

In Example 25, the subject matter of Example 24 optionally includes, wherein the gradient function is used to maximize an objective function, the objective function equaling a summation of a plurality of link weights multiplied by a plurality of rate allocations for a specified transmission time, the plurality of link weights and the plurality of rate allocations corresponding to links for the plurality of UEs.

In Example 26, the subject matter of any one or more of Examples 24-25 optionally include, further comprising operations to receive a data packet over the link from the second UE at the increased transmission power during a data transmission subframe of the frame.

In Example 27, the subject matter of any one or more of Examples 24-26 optionally include, wherein the gradient function compares a momentum of an increase to the predetermined transmission power to a momentum of decreases in power of the plurality of UEs other than the second UE.

In Example 28, the subject matter of any one or more of Examples 23-27 optionally include, further comprising operations to determine that the predetermined transmission power is to be increased to an increased transmission power and wherein the transceiver circuitry is to send a third symbol to the second UE indicating the increased transmission power.

In Example 29, the subject matter of Example 28 optionally includes, further comprising operations to receive a second plurality of wideband symbols from the plurality of UEs including the second UE, the second plurality of wideband symbols having corresponding signal strengths and interference levels.

In Example 30, the subject matter of Example 29 optionally includes, further comprising operations to determine whether the increased transmission power of the second UE is to be increased or decreased by comparing the link weight for the link and the channel gain for the link to the signal strengths and the interference levels of the second plurality of wideband symbols.

In Example 31, the subject matter of any one or more of Examples 28-30 optionally include, further comprising operations to receive the data indicated in the first symbol at the increased transmission power.

In Example 32, the subject matter of any one or more of Examples 28-31 optionally include, wherein the predetermined transmission power is received in a first subframe of a frame, the third symbol indicating the increased transmission power is sent in a second subframe of the frame, and the plurality of wideband signals are received in a third subframe of the frame.

In Example 33, the subject matter of any one or more of Examples 23-32 optionally include, wherein the rate allocations are determined using received signal to interference plus noise ratios (SINRs), power allocations, and channel states.

In Example 34, the subject matter of any one or more of Examples 23-33 optionally include, wherein the predetermined transmission power is a maximum transmission power.

In Example 35, the subject matter of any one or more of Examples 23-34 optionally include, further comprising operations to determine that the predetermined transmission power is to be decreased to a decreased transmission power and wherein the transceiver circuitry is to send a fourth symbol to the second UE indicating the decreased transmission power, wherein the predetermined transmission power is received in a first subframe of a frame and the fourth symbol is sent in a second subframe of the frame.

In Example 36, the subject matter of any one or more of Examples 23-35 optionally include, wherein the first symbol and the second symbol are analog tone-based signals with unique tones specified in two-dimensional frequency and time domains.

Example 37 is a method of controlling a User Equipment (UE) configured for device-to-device (D2D) communication, the method comprising: receiving a first symbol and a second symbol from a second UE over a link, the first symbol indicating data to be sent and the second symbol indicating a link weight for the link; receiving a plurality of wideband symbols from a plurality of UEs including the second UE, the plurality of wideband symbols having corresponding signal strengths and interference levels; determining a channel gain for the link based on predetermined transmission power and a received transmission power of the second symbol over the link; and determining whether the predetermined transmission power is to be changed based on a comparison of the link weight for the link and the channel gain for the link to the signal strengths and the interference levels of the plurality of wideband symbols.

In Example 38, the subject matter of Example 37 optionally includes, wherein the first and second symbols are sent by the second UE at the predetermined transmission power, and wherein determining whether the predetermined transmission power is to be changed based on the comparison includes using a gradient function.

In Example 39, the subject matter of Example 38 optionally includes, wherein the gradient function is used to maximize an objective function, the objective function equaling a summation of a plurality of link weights multiplied by a plurality of rate allocations for a specified transmission time, the plurality of link weights and the plurality of rate allocations corresponding to links for the plurality of UEs.

In Example 40, the subject matter of any one or more of Examples 38-39 optionally include, further comprising receiving a data packet over the link from the second UE at the increased transmission power during a data transmission subframe of the frame.

In Example 41, the subject matter of any one or more of Examples 38-40 optionally include, wherein the gradient function compares a momentum of an increase to the predetermined transmission power to a momentum of decreases in power of the plurality of UEs other than the second UE.

In Example 42, the subject matter of any one or more of Examples 37-41 optionally include, further comprising determining that the predetermined transmission power is to be increased to an increased transmission power and sending a third symbol to the second UE indicating the increased transmission power.

In Example 43, the subject matter of Example 42 optionally includes, further comprising receiving a second plurality of wideband symbols from the plurality of UEs including the second UE, the second plurality of wideband symbols having corresponding signal strengths and interference levels.

In Example 44, the subject matter of Example 43 optionally includes, further comprising determining whether the increased transmission power of the second UE is to be increased or decreased by comparing the link weight for the link and the channel gain for the link to the signal strengths and the interference levels of the second plurality of wideband symbols.

In Example 45, the subject matter of any one or more of Examples 42-44 optionally include, further comprising receiving the data indicated in the first symbol at the increased transmission power.

In Example 46, the subject matter of any one or more of Examples 42-45 optionally include, wherein the predetermined transmission power is received in a first subframe of a frame, the third symbol indicating the increased transmission power is sent in a second subframe of the frame, and the plurality of wideband signals are received in a third subframe of the frame.

In Example 47, the subject matter of any one or more of Examples 37-46 optionally include, wherein the rate allocations are determined using received signal to interference plus noise ratios (SINRs), power allocations, and channel states.

In Example 48, the subject matter of any one or more of Examples 37-47 optionally include, wherein the predetermined transmission power is a maximum transmission power.

In Example 49, the subject matter of any one or more of Examples 37-48 optionally include, further comprising determining that the predetermined transmission power is to be decreased to a decreased transmission power and sending a fourth symbol to the second UE indicating the decreased transmission power, wherein the predetermined transmission power is received in a first subframe of a frame and the fourth symbol is sent in a second subframe of the frame.

In Example 50, the subject matter of any one or more of Examples 37-49 optionally include, wherein the first symbol and the second symbol are analog tone-based signals with unique tones specified in two-dimensional frequency and time domains.

Example 51 is at least one machine-readable medium including instructions for operation of a computing system, which when executed by a machine, cause the machine to perform operations of any of the methods of Examples 37-50.

Example 52 is an apparatus comprising means for performing any of the methods of Examples 37-50.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. An apparatus of User Equipment (UE) configured for device-to-device (D2D) communication, the apparatus comprising:
    transceiver circuitry to:
        receive a first symbol and a second symbol from a second UE over a link, the first symbol indicating data to be sent and the second symbol indicating a link weight for the link; and
        receive a plurality of wideband symbols from a plurality of UEs including the second UE;
        perform measurements to determine from the plurality of wideband symbols, corresponding signal strengths and interference levels; and
    processing circuitry to:
        determine a channel gain for the link based on predetermined transmission power and a received transmission power of the second symbol over the link; and
        determine whether the predetermined transmission power is to be changed based on a comparison of the link weight for the link and the channel gain for the link to the signal strengths and the interference levels of the plurality of wideband symbols.

2. The apparatus of claim 1, wherein the first and second symbols are sent by the second UE at the predetermined transmission power, and wherein the processing circuitry is to determine whether the predetermined transmission power is to be changed based on the comparison includes using a gradient function.

3. The apparatus of claim 2, wherein the gradient function is used to maximize an objective function, the objective function equaling a summation of a plurality of link weights multiplied by a plurality of rate allocations for a specified transmission time, the plurality of link weights and the plurality of rate allocations corresponding to links for the plurality of UEs.

4. The apparatus of claim 2, wherein the transceiver circuitry is to receive a data packet over the link from the second UE at the increased transmission power during a data transmission subframe of the frame.

5. The apparatus of claim 2, wherein the gradient function compares a momentum of an increase to the predetermined transmission power to a momentum of decreases in power of the plurality of UEs other than the second UE.

6. The apparatus of claim 1, wherein the processing circuitry is to determine that the predetermined transmission power is to be increased to an increased transmission power and wherein the transceiver circuitry is to send a third symbol to the second UE indicating the increased transmission power.

7. The apparatus of claim 6, wherein the transceiver circuitry is to receive a second plurality of wideband symbols from the plurality of UEs including the second UE, the second plurality of wideband symbols having corresponding signal strengths and interference levels.

8. The apparatus of claim 7, wherein the processing circuitry is to determine whether the increased transmission power of the second UE is to be increased or decreased by comparing the link weight for the link and the channel gain for the link to the signal strengths and the interference levels of the second plurality of wideband symbols.

9. The apparatus of claim 6, wherein the transceiver circuitry is to receive the data indicated in the first symbol at the increased transmission power.

10. The apparatus of claim 6, wherein the predetermined transmission power is received in a first subframe of a frame, the third symbol indicating the increased transmission power is sent in a second subframe of the frame, and the plurality of wideband signals are received in a third subframe of the frame.

11. The apparatus of claim 1, wherein the rate allocations are determined using received signal to interference plus noise ratios (SINRs), power allocations, and channel states.

12. The apparatus of claim 1, wherein the predetermined transmission power is a maximum transmission power.

13. The apparatus of claim 1, wherein the processing circuitry is to determine that the predetermined transmission power is to be decreased to a decreased transmission power and wherein the transceiver circuitry is to send a fourth symbol to the second UE indicating the decreased transmission power, wherein the predetermined transmission power is received in a first subframe of a frame and the fourth symbol is sent in a second subframe of the frame.

14. The apparatus of claim 1, wherein the first symbol and the second symbol are analog tone-based signals with unique tones specified in two-dimensional frequency and time domains.

15. The apparatus of claim 1, wherein the processing circuitry includes a baseband processor configured to decode the first symbol and the second symbol.

16. The apparatus of claim 1, further comprising one or more antennas coupled to the transceiver circuitry.

17. An apparatus of User Equipment (UE) configured for device-to-device (D2D) communication, the apparatus comprising:
  transceiver circuitry to:
    receive a first symbol and a second symbol sent at a predetermined transmission power directly from a second UE over a D2D link, the first symbol indicating data to be sent and the second symbol indicating a link weight for the link; and
    receive a plurality of wideband symbols from a plurality of UEs including the second UE; and
  processing circuitry to:
    configure the transceiver circuitry to perform measurements to determine from the plurality of wideband symbols, corresponding signal strengths and interference levels;
    determine a channel gain for the link using the predetermined transmission power and a received transmission power of the second symbol over the D2D link; and
    determine that the predetermined transmission power is to be changed to an increased transmission power by determining that a gradient function indicates that an increase in the predetermined transmission power maximizes an objective function.

18. The apparatus of claim 17, wherein the transceiver circuitry is to send a third symbol to the second UE indicating the increased transmission power.

19. The apparatus of claim 18, wherein the transceiver circuitry is to receive a second plurality of wideband symbols from the plurality of UEs including the second UE, the second plurality of wideband symbols having corresponding signal strengths and interference levels.

20. The apparatus of claim 19, wherein the processing circuitry is to determine that the gradient function indicates that the increase in the predetermined transmission power maximizes the objective function by using the gradient function to compare the link weight for the link and the channel gain for the link to the signal strengths and the interference levels of the second plurality of wideband symbols.

21. The apparatus of claim 18, wherein the transceiver circuitry is to receive the data indicated in the first symbol at the increased transmission power.

22. The apparatus of claim 18, wherein the predetermined transmission power is received in a first subframe of a frame, the third symbol indicating the increased transmission power is sent in a second subframe of the frame, and the plurality of wideband signals are received in a third subframe of the frame.

23. A non-transitory computer-readable storage medium that stores instructions for execution by one or more processors of a user equipment (UE) to configure the UE to perform operations to:
  receive a first symbol and a second symbol from a second UE over a link, the first symbol indicating data to be sent and the second symbol indicating a link weight for the link;
  receive a plurality of wideband symbols from a plurality of UEs including the second UE;
  configure the UE to perform measurements to determine from the plurality of wideband symbols, corresponding signal strengths and interference levels;
  determine a channel gain for the link based on predetermined transmission power and a received transmission power of the second symbol over the link; and
  determine whether the predetermined transmission power is to be changed based on a comparison of the link weight for the link and the channel gain for the link to the signal strengths and the interference levels of the plurality of wideband symbols.

24. The non-transitory computer-readable storage medium of claim 23, wherein the first and second symbols are sent by the second UE at the predetermined transmission power, and wherein the processing circuitry is to determine whether the predetermined transmission power is to be changed based on the comparison includes using a gradient function.

25. The non-transitory computer-readable storage medium of claim 24, wherein the gradient function is used to maximize an objective function, the objective function equaling a summation of a plurality of link weights multiplied by a plurality of rate allocations for a specified transmission time, the plurality of link weights and the plurality of rate allocations corresponding to links for the plurality of UEs.

* * * * *